United States Patent Office 3,415,860
Patented Dec. 10, 1968

3,415,860
PREPARATION OF ANTIMONY TRIACETATE
Robert R. Thomas, Cary, N.C., assignor to Monsanto Company, St. Louis, Mo., a corporation of Delaware
No Drawing. Filed Mar. 18, 1966, Ser. No. 535,331
4 Claims. (Cl. 260—446)

This invention relates to a new and improved chemical process. More particularly, this invention relates to a new and improved process for the preparation of antimony triacetate.

Antimony compounds are well known as polymerization catalysts in the preparation of polyesters, such as polyethylene terephthalate. It is known that the use of the antimony type catalyst produces a product having outstanding properties when compared to polyesters prepared using other polymerization catalysts. Antimony triacetate is known to serve as an excellent polymerization catalyst in the preparation of polyesters and polyethylene terephthalate in particular. One method of preparing antimony triacetate is by heating essentially stoichiometric quantities of antimony trioxide and acetic anhydride. The product obtained is then purified by distillation. However, this reaction between acetic anhydride and antimony trioxide is exothermic and, therefore, difficult to carry out on a large scale. In addition, some pyrolysis of the antimony triacetate apparently occurs on distillation, producing a product of low purity and poor yields.

It is an object of this invention to provide a new and improved process for the preparation of antimony triacetate on a large scale and in high yields.

It is another object of this invention to provide a new and improved antimony triacetate having outstanding purity.

Other objects and advantages of this invention will be apparent from the description thereof which follows.

The objects of this invention are accomplished by reacting essentially stoichiometric quantities of acetic anhydride and antimony trioxide in the presence of an anhydrous inert solvent for the antimony triacetate and at a temperature sufficient to cause the reaction between the antimony trioxide and the acetic anhydride.

The anhydrous inert solvent referred to above may be any compound which does not enter into the reaction and which serves as a solvent for the antimony triacetate produced. Illustrative of compounds that may be used as the anhydrous inert solvent are m-xylene, p-xylene, o-xylene, and mixtures thereof, alkyl benzenes and the like. Any amount of the anhydrous inert solvent may be used which will give a homogeneous solution of antimony triacetate at the temperature of the reaction. It was found that the use of 2 liters of xylene per mole of antimony trioxide was satisfactory for the purpose of this invention.

Stoichiometric amounts of the acetic anhydride and the antimony trioxide are used as starting materials for this reaction. This means that for each mole of antimony trioxide used, it is necessary to use three moles of acetic anhydride. An excess of acetic anhydride may be used if desired. However, it is preferable to use from about 3 to 3.3 moles of acetic anhydride per mole of antimony trioxide.

The reaction is normally carried out at the reflux temperature of the reaction medium. This temperature will vary depending upon the nature of the anhydrous inert solvent used in the reaction medium. A temperature of between about 90° C. and 200° C. is necessary to carry out the reaction. A reaction time of about 3–5 hours is usually required to complete the reaction. The reaction is essentially complete when a clear solution is obtained.

To further illustrate the present invention and the advantages thereof, the following specific examples are given, it being understood that these are intended to be merely illustrative and not limitative. Unless otherwise indicated, all parts and percents are by weight.

Example 1

The following example illustrates the exothermicity of the reaction between acetic anhydride and antimony trioxide on a small scale that would yield only one-tenth mole of product.

Antimony trioxide (15.30 grams) was placed in a 1-liter flask held in a heating mantle. The flask was fitted with a stirrer, condenser and dropping funnel. Acetic anhydride (15 mm.) was added to the antimony trioxide to form a thick paste, which was spread as a thin film over the base of the flask by use of the stirrer. The reaction medium was heated up to a temperature of about 165–185° C. over a 5-minute period. During this time, refluxing of the acetic anhydride occurred and some of the paste dried out. The heat was discontinued for 5 minutes and then the heating mantle was completely removed. After an additional 5 minutes of cooling some liquefaction of the paste occurred. After several additional minutes of cooling, the paste was wholly converted to a thin mobile liquid, which then solidified during this cooling period. The product formed was medium brown in color. It was clear from the care required in applying and from the discoloration of the product that the reaction was a difficult one to control and the product obtained was of low purity.

Example 2

This example shows the exothermic reaction between acetic anhydride and antimony trioxide that can occur when operating on a large (2 mole) scale.

Antimony trioxide (517.6 grams) was placed in a 2-liter flask held in a heating mantle. The flask was fitted with a stirrer, condenser and dropping funnel. Acetic anhydride (570 mm.) was added to the antimony trioxide to form a slurry. This slurry was stirred and heated. Five minutes after the reaction slurry was heated, the slurry began to bubble and some of the acetic anhydride started to reflux. After an additional five minutes, the slurry was bubbling vigorously and the heat was discontinued. The reaction continued to gain in ferocity and liquid and vapor were ejected through the condenser before the reaction subsided. After an additional five minutes, the temperature of the dark brown reaction mass was found to be 220° C. It was not possible to control the reaction when operating on this large a scale.

Example 3

This example shows how antimony trioxide and acetic anhydride may be reacted in an anhydrous inert solvent to give a high yield of high purity antimony triacetate that requires no further purification.

Antimony trioxide (292 grams) and acetic anhydride (306 grams) were added to 2 liters of anhydrous xylene in a 5-liter, round-bottom flask fitted with a stirrer, condenser, and heating mantle. This slurry was refluxed for three hours at a temperature of about 135–140° C. The resulting solution was cooled to about 100° C. and filtered. The filtrate obtained was cooled to 10° C. to produce a solution containing precipitate of antimony triacetate. This antimony triacetate precipitate was removed by filtration, washed with hexane, reslurried in hexane and again removed by filtration. The product obtained was vacuum dried at 50–60° C. for 18–20 hours. A yield of 284 grams (95 percent) of antimony triacetate having a melting point of 134–136° C. was obtained.

In a comparative literature preparation, antimony trioxide was produced by the reaction of 29.1 grams of antimony trioxide and 30.6 grams of acetic anhydride. The reaction product was distilled at a temperature of 167–

168° C. at a pressure of 0.5 mm. of Hg. The product obtained was reported to have a melting point of 124° C. and 80 percent of the theoretical yield was obtained.

Example 4

The procedure followed in Example 3 was repeated except that anhydrous toluene was used in place of the anhydrous xylene and the reaction mixture was refluxed at 110° C. for about 3–5 hours. A product of comparable yield and purity to that obtained in Example 3 was obtained.

It is to be understood that changes and variations may be made in the present invention without departing from the spirit and scope thereof as defined in the appended claims.

I claim:

1. A process for the preparation of antimony triacetate which comprises reacting antimony trioxide and acetic anhydride in an anhydrous inert solvent for the antimony triacetate and at a temperature sufficient to cause the reaction between the antimony trioxide and the acetic anhydride.

2. A process for the preparation of antimony triacetate which comprises reacting antimony trioxide and 3 to 3.3 moles of acetic anhydride per mole of antimony trioxide in an anhydrous inert solvent present in an amount that will give a homogeneous solution of antimony triacetate and at a temperature of about 90° C. to 200° C.

3. A process as defined in claim 2 wherein the anhydrous inert solvent used is xylene.

4. A process as defined in claim 2 wherein the anhydrous inert solvent used is toluene.

References Cited

UNITED STATES PATENTS

| | | | |
|---|---|---|---|
| 2,996,528 | 8/1961 | Marks et al. | 260—446 |
| 3,031,425 | 4/1962 | Schoepfle et al. | 260—446 X |
| 3,211,768 | 10/1965 | Considine et al. | 260—446 X |

OTHER REFERENCES

Braums, Chemical Abstracts (1957), vol. 51, p. 12721(d), QD1 A51.

TOBIAS E. LEVOW, *Primary Examiner.*

W. F. W. BELLAMY, *Assistant Examiner.*

U.S. Cl. X.R.

252—431